(12) United States Patent
Goldstein et al.

(10) Patent No.: US 11,714,767 B1
(45) Date of Patent: Aug. 1, 2023

(54) DMA MECHANISM WITH INLINE DATA SERVICES

(71) Applicant: Lightbits Labs Ltd., Kfar Saba (IL)

(72) Inventors: Roii Goldstein, Beit Dagan (IL); Ofer Hayut, Rosh Pina (IL); Roy Geron, Beit Izchaq (IL)

(73) Assignee: LIGHTBITS LABS LTD., Kfar Saba (IL)

( * ) Notice: Subject to any disclaimer, the term of this patent is extended or adjusted under 35 U.S.C. 154(b) by 0 days.

(21) Appl. No.: 17/565,859

(22) Filed: Dec. 30, 2021

(51) Int. Cl.
*G06F 13/28* (2006.01)
*G06F 3/06* (2006.01)

(52) U.S. Cl.
CPC ............ *G06F 13/28* (2013.01); *G06F 3/0604* (2013.01); *G06F 3/064* (2013.01); *G06F 3/0679* (2013.01)

(58) Field of Classification Search
CPC ................................. G07C 13/00; G06F 13/28
See application file for complete search history.

(56) References Cited

U.S. PATENT DOCUMENTS

| | | | |
|---|---|---|---|
| 9,459,957 B2 | 10/2016 | Sella et al. | |
| 2009/0240349 A1* | 9/2009 | Tanaka | G05B 19/054 |
| | | | 700/19 |
| 2011/0219150 A1* | 9/2011 | Piccirillo | G06F 21/85 |
| | | | 710/24 |
| 2012/0124248 A1* | 5/2012 | Chi | G06F 12/1081 |
| | | | 710/22 |
| 2013/0086187 A1* | 4/2013 | Cohen | H04L 63/126 |
| | | | 709/206 |
| 2015/0012339 A1* | 1/2015 | Onischuk | G07C 13/00 |
| | | | 235/386 |
| 2022/0212340 A1* | 7/2022 | Hasegawa | G06N 3/08 |

* cited by examiner

*Primary Examiner* — Getente A Yimer
(74) *Attorney, Agent, or Firm* — Pearl Cohen Zedek Latzer Baratz LLP

(57) ABSTRACT

A system and method for performing a combined storage operation, the method including using a direct memory access (DMA) controller to obtain a modified DMA command, wherein the modified DMA command includes parameters of a data manipulation and one of a user read command or a user write command; retrieve data according to the user read command or the user write command; manipulate the data according to the parameters of a data manipulation, inline with the user read command or the user write command; and transmit the manipulated data according to the user read command or the user write command.

15 Claims, 6 Drawing Sheets

PRIOT ART

DMA MECHANISM WITH INLINE DATA SERVICES

FIELD OF THE INVENTION

The present invention relates generally to direct memory access (DMA) operations. More specifically, the present invention relates to a DMA mechanism with inline data services for storage systems.

BACKGROUND

DMA controllers may access the system storage, e.g., a redundant array of independent disks (RAID), or other types of storage, and other peripherals, independently of the host central processing unit (CPU). A DMA controller may mange the transfer of data between the host and the storage, and other peripherals, and thus free the host to perform other operations while the data transfer is being performed.

FIG. 1 is a schematic illustration of a typical prior art processing system 100 incorporating a DMA controller 130. Host 110 may perform read and write commands, e.g., may transfer data from and to storage 120, respectively. To initiate a data transfer, host 110 may send a DMA command, commonly referred to as scatter-gather list (SGL), that may include a list of contiguous-block transfers. DMA controller 130 may obtain the SGL form the host 110 and may transfer blocks of data as specified in the SGL, e.g., over bus 160.

Prior art processing system 100 may further include a data manipulation unit 140, that may perform various operations or data manipulations related to data services and/or ongoing management of storage 120. Those operations may include, for example, deduplication, compression, decompression, data reconstruction, cyclic redundancy check (CRC), encryption, decryption, pattern recognition, error correction (EC) coding, and/or error correction. Data manipulation unit 140 may retrieve data from storage 120, perform the required data manipulation and/or write the data back to storage 120.

SUMMARY

According to embodiments of the invention, a system and method for combining DMA operations and data services may include obtaining a joint data transfer command, where the joint data transfer command may include at least one parameter of a data transfer and at least one parameter of manipulation to be applied on the transferred data; transferring the data according to the at least one parameter of the data transfer; and while transferring the data, manipulating the data according to the at least one parameter of the manipulation.

According to embodiments of the invention, the joint data transfer command may include a user read command, where transferring the data may include retrieving the data from a storage and transmitting the manipulated data to a host device.

According to embodiments of the invention, manipulating the data may include at least one of decompression, data reconstruction, cyclic redundancy check (CRC), decryption, pattern recognition, and error correction.

According to embodiments of the invention, the modified DMA command may include a user write command, wherein transferring the data comprises obtaining data from a host device and writing the manipulated data in a storage.

According to embodiments of the invention, manipulating the data may include at least one of data compression, error correction coding, deduplication functionality, cyclic redundancy encode (CRC) and encryption.

According to embodiments of the invention, the joint data transfer command may include a scatter gather list (SGL) modified to comprise the parameters of the data manipulation.

According to embodiments of the invention, a system and method for performing a combined storage operation using a direct memory access (DMA) controller may include: obtaining a modified DMA command, where the modified DMA command may include parameters of a data manipulation and one of a user read command or a user write command; retrieving data according to the user read command or the user write command; manipulating the data according to the parameters of a data manipulation, inline with the user read command or the user write command; and transmitting the manipulated data according to the user read command or the user write command.

According to embodiments of the invention, the modified DMA command may include the user read command, retrieving the data may include retrieving the data from a storage, and transmitting the manipulated data may include transmitting the manipulated data to a host device.

According to embodiments of the invention, manipulating the data may include at least one of decompression, data reconstruction, cyclic redundancy check (CRC), decryption, pattern recognition, and error correction.

According to embodiments of the invention, the modified DMA command may include a user write command, and retrieving the data may include obtaining data from a host device, and transmitting the data may include writing the manipulated data in a storage.

According to embodiments of the invention, manipulating the data may include at least one of data compression, error correction coding, deduplication functionality, cyclic redundancy encode (CRC) and encryption.

According to embodiments of the invention, the modified DMA command may include a scatter gather list (SGL) modified to include the parameters of the data manipulation.

Embodiments of the invention may be implemented in a dedicated logic circuit or hardware design.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
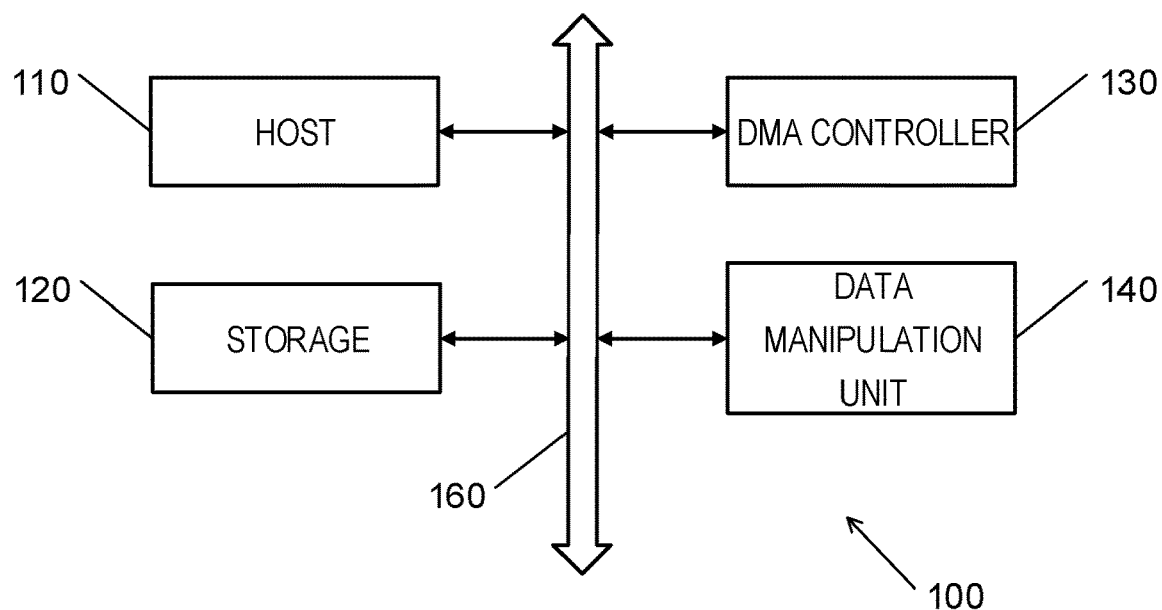
FIG. 1 is a schematic illustration of a typical prior art processing system incorporating a DMA controller.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Returning to FIG. 1, data manipulation unit 140, responsible for performing ongoing management of storage 120, may retrieve data from storage 120, perform the required data manipulation and write the data back to storage 120. Thus, data previously written to storage 120 by DMA controller 130 may be retrieved by data manipulation unit 140 to perform various operations. This may create duplications of read and/or write operations to storage 120, as the same data that was previously written to storage 120 can be read manipulated and rewritten back to storage 120.

In some embodiments, data transfer includes one of a user read or a user write operations. For example, to perform the data transfer, host 110 may issue a data transfer command, e.g., in the form of an SGL. The SGL may include parameters of the data transfer, e.g., parameters defining the data that should be transferred and the source and destination locations. For example, for performing a user write command, host 110 may issue data transfer command providing the source address of the data that can be written to storage 120, the destination address in storage 120 and the size of the data block. Similarly, for performing a user read commend, host 110 may issue data transfer command providing the source address of the data in storage 120, the destination address and the size of the data block.

DMA controller 130 may obtain the data transfer command, e.g., the SGL, and may transfer the specified data from the source address to the destination address, as specified in the SGL. DMA controller 130 may provide an interrupt to host 110 once the data transfer is completed.

Embodiments of the invention may provide a system and method for eliminating and/or at least reducing duplications of read and/or write operations performed by data manipulation unit 140. Some embodiments of the invention may reduce the number of storage access operations, improve the overall performance of the computing system, and/or reduce the required hardware resources required for managing storage 120.

Figure 2:
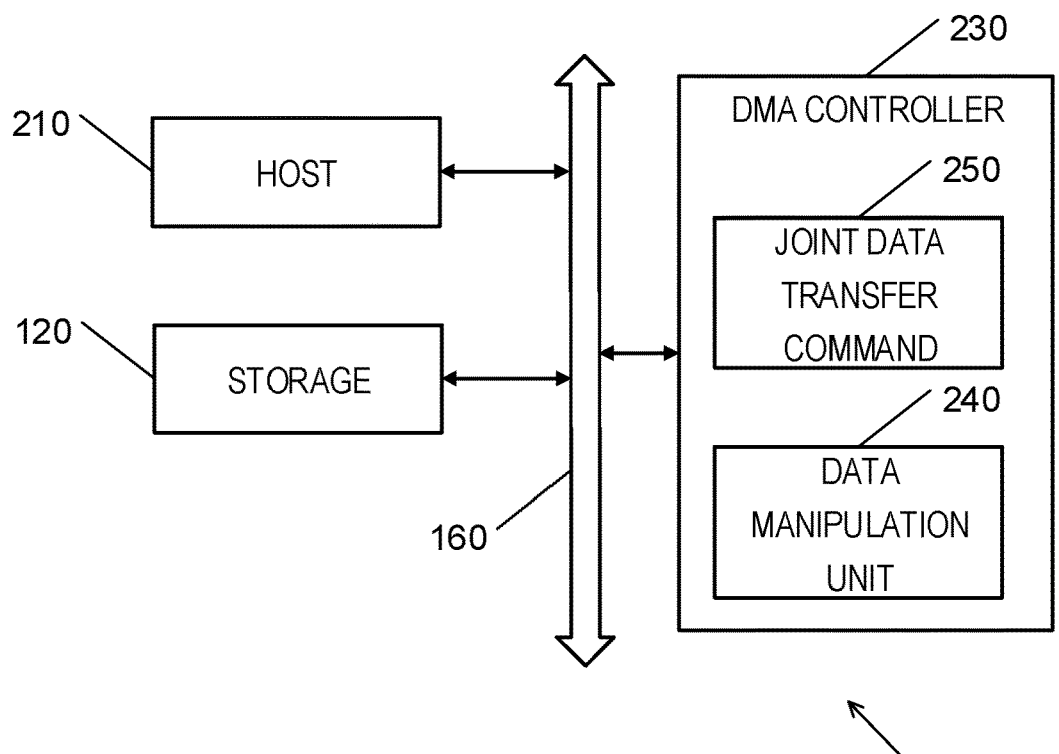
FIG. 2 is a schematic illustration of a processing system, according to embodiments of the invention.

Reference is now made to FIG. 2, which is a schematic illustration of a processing system 200, according to embodiments of the invention. Processing system 200, may include data manipulation unit 240, that may be combined or integrated with DMA controller 230. According to some embodiments of the invention, DMA controller 230 transfers data between host 210 and storage 120, e.g., via bus 160 (or other routes and connections, not shown), and/or performs one or more manipulations on the transferred data, inline with the data transfer. Performing one or more manipulations on the transferred data inline with the data transfer may include performing one or more manipulations on the data while the data is being transferred, or as part of a sequence of operations of transferring the data. Data manipulation unit 240 may perform the data manipulations or data services as an integral part of the data transfer.

According to some embodiments, data transfer includes one or more of a user read or a user write. The data manipulation may include any manipulations required for providing data services to the stored data. The data services may include compression/decompression, CRC and error correction coding/error correction, deduplication functionality, encryption/decryption, and/or pattern recognition. The data services may include other data services as are known in the art. In some embodiments, error correction coding and/or error correction complies with Redundant Array of Independent Disks (RAID) 6 configuration.

In some embodiments, host 210 issues a combined or joint data transfer command 250 to DMA controller 230, e.g., one or more user read commands and/or user write commands combined with a command to perform one or more data manipulations related to data services (e.g., a data manipulation command). The combined data transfer command, also referred to herein as a modified DMA command, may be in the form of an SGL command that is modified or improved, and may include one or more parameters of at least one data transfer commands and one or more parameters of the data manipulation command, e.g., parameters defining the manipulation to be applied on the transferred data, or on parts of the transferred data, and the parts or portions of the transferred data that should be manipulated.

DMA controller 230 may obtain the combined or joint data transfer command 250, may transfer the data according to the parameters of the data transfer and, while transferring the data, data manipulation unit 240 may manipulate the data according to the parameters of the data manipulation command.

An example combined or joint data transfer command 250 (also referred to as modified DMA command) may include a user read command and one or more data manipulation commands. To perform the user read command, DMA controller 230 may retrieve the data from a source address in storage 120, and before transmitting the manipulated data to host 210, data manipulation unit 240 may perform the data manipulation command. For example, data manipulation commands related to a user read command may include decompression, data reconstruction, CRC check, decryption, pattern recognition, error correction, etc. Another example for a combined or joint data transfer command 250 (or modified DMA command) may include a user write command and one or more data manipulation commands. To perform the user write command, DMA controller 230 may retrieve the data from host 210, and before writing the data to storage 120, data manipulation unit 240 may perform the data manipulation command. For example, data manipulation commands related to a user write command may include data compression, error correction coding, deduplication functionality, CRC, encryption, etc. Other data transfer commands and/or data manipulation commands may be used, as are known in the art DMA controller 230 may include a logic design or a logic circuit configured to perform the functions described herein, e.g., to obtain the joint data transfer command 250 and perform the combined DMA operations and data services operations. DMA controller 230 may be implemented in hardware, e.g., in a chip, integrated circuit (IC), field programmable gate array (FPGA), application-specific integrated circuit (ASIC), system on a chip (SoC), etc. DMA controller 230 may include a logic design or a logic circuit, including logic gates and other components for implementing logic functions, as well as some internal storage or registers for storing the transferred data before and after data manipulation.

Storage 120 may be or may include, for example, RAID (of any level), disk storage, drive storage, a read only memory (ROM), hard disk drive (HDD), an optical disc drives (ODD), optical disc media, a Flash memory, a non-volatile memory, a cache memory, a buffer, a short-term memory unit, a long-term memory unit, or other suitable storage units. Storage 120 may be or may include a plurality of possibly different storage units.

Host 210, also referred to as a host device or CPU may include a processor, or any suitable computing or computational device implemented in hardware, e.g., in a chip, IC, FPGA, ASIC, system on a chip (SoC), e.g., together with DMA controller 230 and storage 120, etc.

Figure 3:
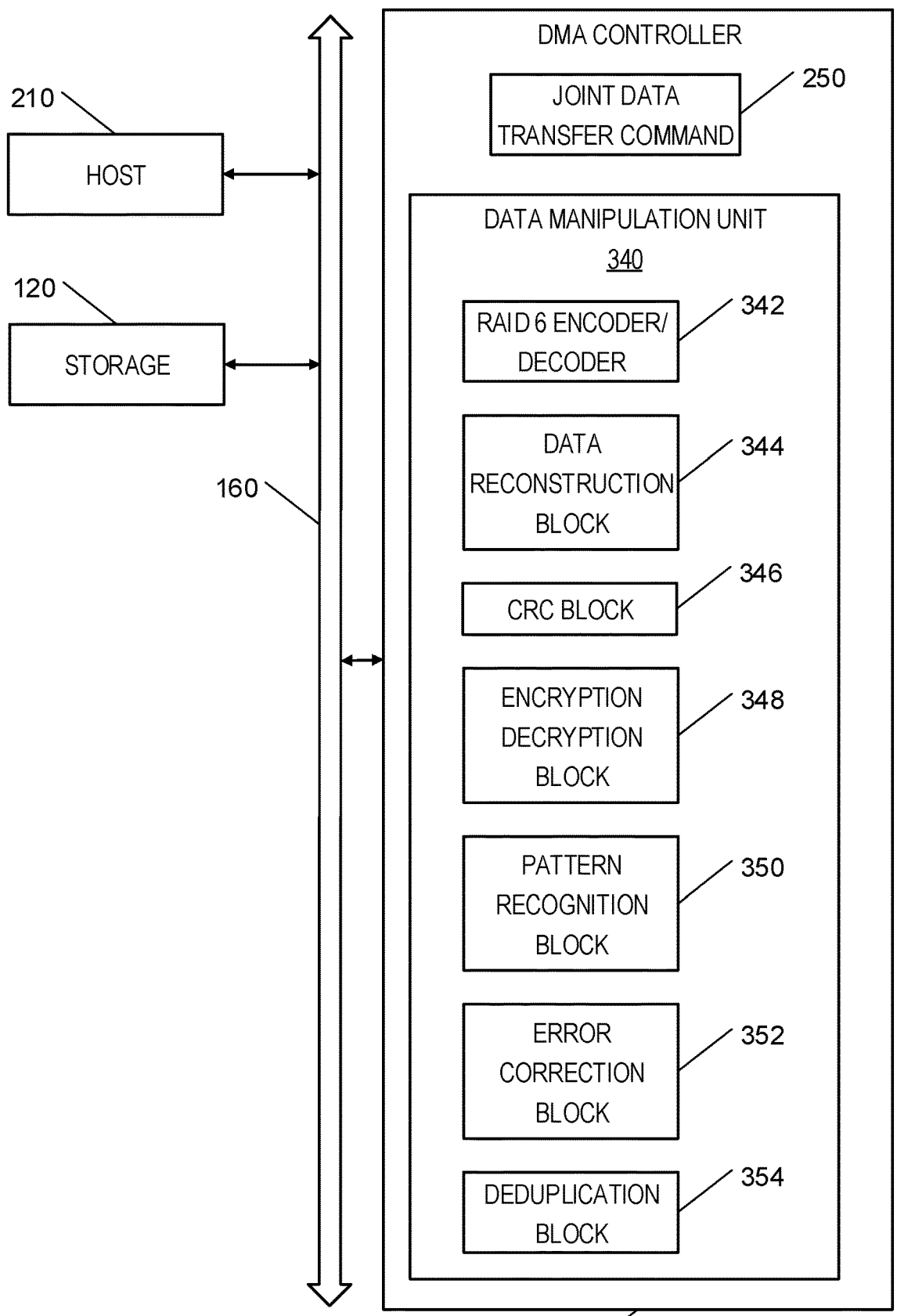
FIG. 3 is a schematic illustration of an example of DMA controller, according to embodiments of the invention.

Reference is now made to FIG. 3, which is a schematic illustration of an example of DMA controller 330, according to embodiments of the invention. DMA controller 330 may include data manipulation unit 340, that may include one or more of RAID 6 encoder/decoder 342, data reconstruction block 344, CRC block 346, encryption decryption block 348, pattern recognition block 350, error correction block 352 and deduplication block 354. RAID 6 encoder/decoder 342, data reconstruction block 344, CRC block 346, encryption decryption block 348, pattern recognition block 350, error correction block 352 and deduplication block 354 may perform the data manipulation commands incorporated in the combined or joint data transfer command. For example:

RAID 6 encoder/decoder 342 may perform data manipulation commands related to RAID 6 compatibility e.g., parity Reed-Solomon calculations.

Data reconstruction block 344 may perform operations related to data reconstruction, e.g., to restoring data after data has been lost or corrupted.

CRC block 346 may perform CRC coding and checking.

Encryption decryption block 348 may perform encryption and decryption of data.

Pattern recognition block 350 may perform pattern recognition on the data.

Error correction block 352 may perform various operations to detect and correct errors in the data.

Deduplication block 354 may perform various operation aimed at eliminating a redundant or duplicated data.

According to some embodiments, data manipulations of the transferred data are performed by data manipulation unit 340 or 240 in a specific order. In some embodiments, the order of performing the data manipulations is defined or included (e.g., by host 310) in the joint data transfer command 250. In some embodiments, the order is hard coded (e.g., using dedicated logic) into data manipulation unit 340 or 240. For example, data manipulation units 340 or 240 may perform data compression prior to encoding or error correction coding, and decoding and error correction prior to decompression. Other ordering of data manipulations may be implemented.

Figure 4:
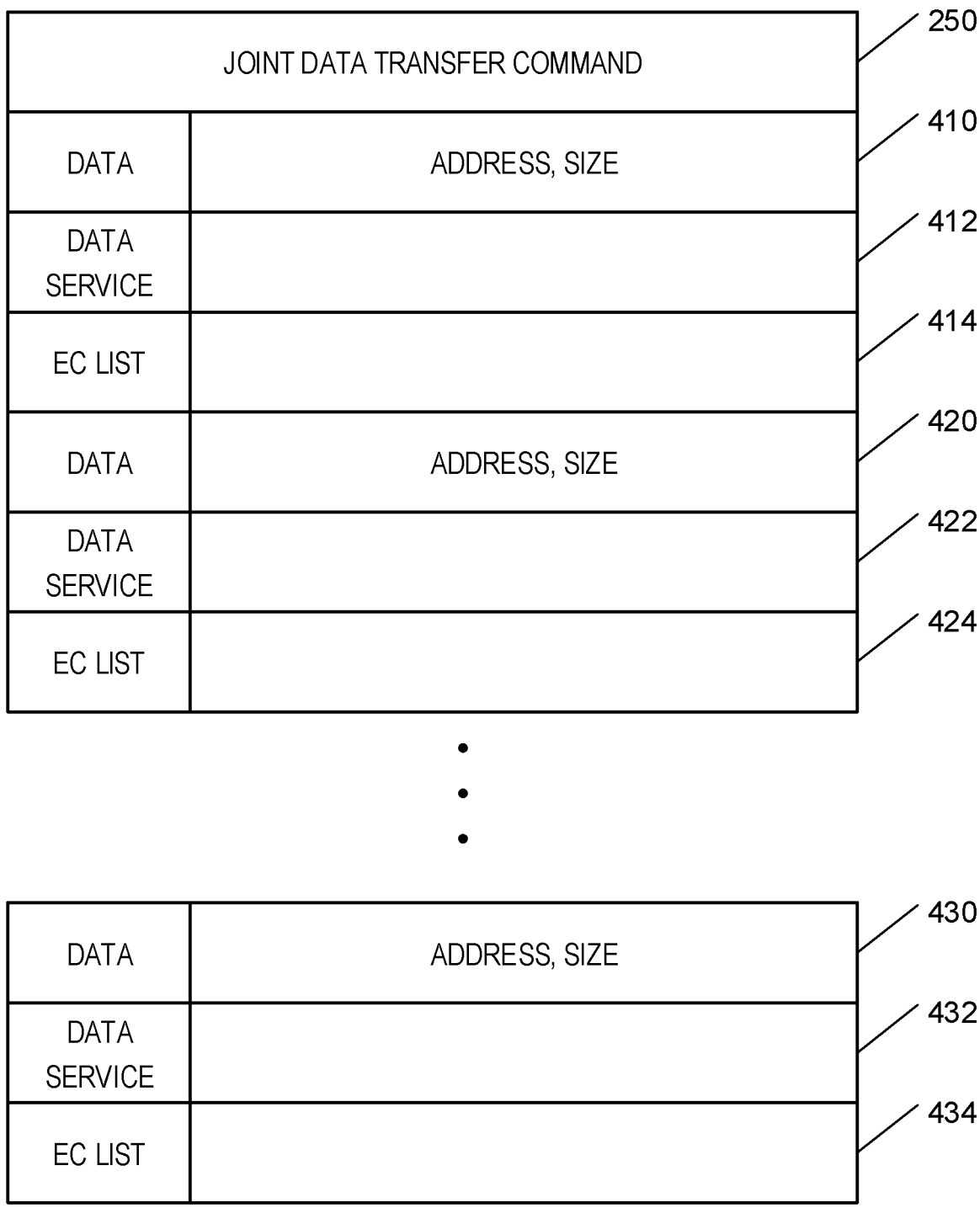
FIG. 4 is an example of joint data transfer command, according to embodiments of the invention.

Reference is now made to FIG. 4, which is an example of joint data transfer command 250, according to embodiments of the invention. Joint data transfer command 250 may be generated by host 210 and sent to DMA controller 330, that may perform the joint data transfer command 250. Joint data transfer command 250 may include a list of data transfer commends 410, 420 and 430, similarly to an SGL. In addition, joint data transfer command 250 may include, for each of the data transfer commends 410, 420 and 430, one or more commands to correct an error (e.g., error correction commands) 414, 424 and 434, and/or other data manipulation commands or data service commands 412, 422 and 432 that need to be performed inline with the data transfer. Each of data transfer commends 410, 420 and 430 may include parameters related to the data transfer, e.g., destination address, source address and block or chunk size (the size of the data that needs to be transferred). Other formats and parameters may be used.

Figure 5:
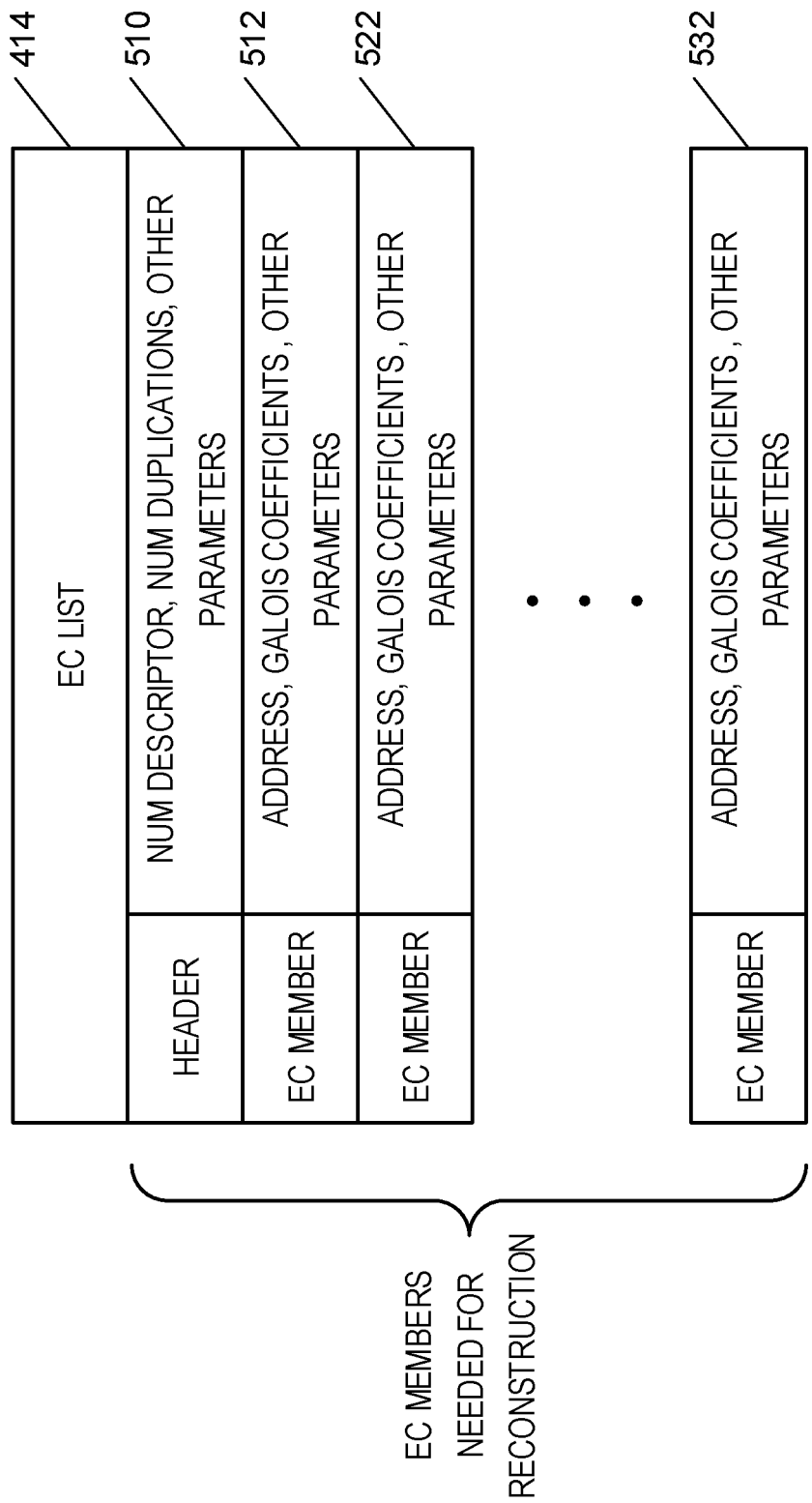
FIG. 5 is an example of error correction command included in joint data transfer command, according to embodiments of the invention.

Reference is now made to FIG. 5, which is an example of a command to correct an error, (e.g., an error correction command), 414 included in joint data transfer command 250, according to embodiments of the invention. In some embodiments, error correction command is issued to perform correction coding and/or error correction in accordance with RAID 6 configuration. However, correction coding and/or error correction in accordance with RAID 6 configuration may require different parameters or parameter values for different data pieces. According to some embodiments, the command to correct an error 414 includes a plurality of EC members, each defining a chunk of data and associated parameters. According to some embodiments, performing error correction includes restoring an amount of lost data (e.g., a chunk of lost data) by retrieving multiple chunks of other data (each retrieved chunk referred to herein as an EC member), and performing operations on the retrieved chunks of data (EC members) to restore the lost data. Typically, restoring data that was originally stored in one disk, may require retrieving data from other disks in the system. For example, a parameter referred to as Galois coefficient may be associated with each EC member. The Galois coefficient may be a mathematical coefficient needed for reconstruction of data. Restoring lost data may include multiplying each of the EC members by the associated Galois coefficient and adding or combining the multiplication results to obtain the lost data. Other operations may be used. In some embodiments, some of the retrieved EC members are used twice or more, for restoring two or more different chunks of lost data, e.g., the same EC member may be reused. Thus, the same EC members may be used for restoring multiple chunks of lost data, however, the operations performed for each restoration may be different. For example, in each restoration process the same EC member may be multiplied by a different Galois coefficient. Thus, more than one Galois coefficient may be associated with each EC member, where each Galois coefficient may be used for restoring a different chunk of lost data.

Error correction command 414 may include a header 510, and EC members 512, 522 and 532. Header 510 may include parameters related to error correction command 414 such as number of descriptors (num_descriptors, a parameter that specifies the number of EC members in the EC list, may be related to or equal to the number of disks in storage 120), number of duplications (num_duplications, a parameter that specifies how many data chunks to reconstruct, e.g., how many times to go over the EC list with the different Galois coefficients) and/or other parameters. Each of EC members 512, 522 and 532 may include more parameters related to error correction command 414 such as address and size (of the data needed for reconstruction), Galois coefficients, and/or other parameters. According to embodiments of the invention, error correction command 414 may support performing correction coding and/or error correction in compliance with RAID 6 standard by including a plurality of EC members 512, 522 and 532 and associated parameters that are required to perform RAID 6 operations.

Figure 6:
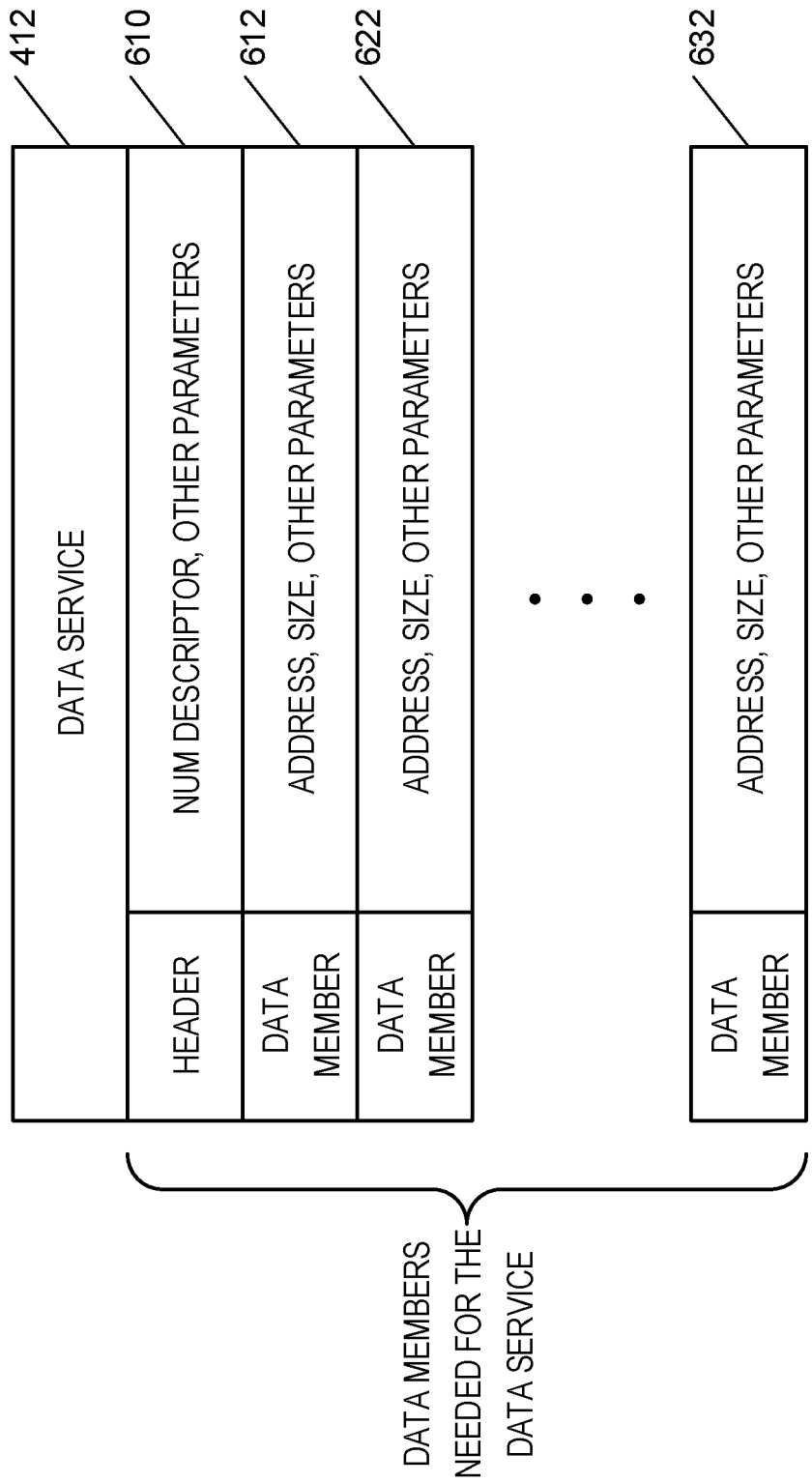
FIG. 6 is an example of data service command included in joint data transfer command, according to embodiments of the invention.

Reference is now made to FIG. 6, which is an example of data service command 412 included in joint data transfer command 250, according to embodiments of the invention. Data service command 412 may include a header 610, and data members 612, 622 and 632. Header 610 may include parameters related to data service command 412. Each of data members 612, 622 and 532 may include one or more parameters related to data service command 412 such as address (defining the address of the fetch data), size (defining the size of the fetch data) and/or other parameters.

By generating and providing joint data transfer command 250 to DMA controller 330, DMA controller may retrieve the data related to the DMA command and perform the required data service on the fly, e.g., as part of the DMA command, as opposed to prior art system 100 in which data manipulation unit 140 would retrieve data from storage 120, perform the data manipulation or data service and write the data back to storage 120, and DMA controller 130 would read or write the same data (depending on the type of DMA command). Some embodiments of the invention reduce the number of access operations to storage 120 and the overall load on storage 120, and by this the operation of processing system 200 in comparison to prior art processing system 100 can be improved.

Figure 7:
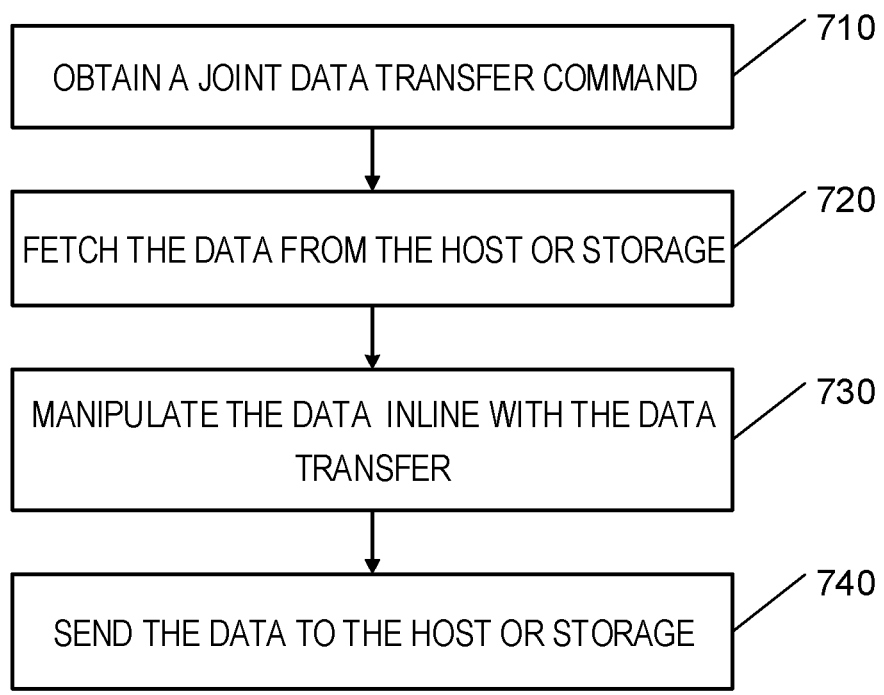
FIG. 7 is a flowchart of a method for performing combined DMA operations and data services, according to embodiments of the invention.

Reference is made to FIG. 7, which is a flowchart of a method for performing combined DMA operations and data services, according to embodiments of the invention. An embodiment of a method for performing combined DMA operations and data services may be performed, for example, by the system shown in FIGS. 1, 2 and 3, or alternatively by another system.

In operation 710, combined or joint data transfer command (e.g., command 250) may be obtained by a hardware module, e.g., DMA controller 230. The combined data transfer command, also referred to herein as a modified DMA command, may be in the form of a modified or improved SGL command, and may include one or more parameters of at least one data transfer commands and one or more parameters of the data manipulation command, e.g., parameters defining the manipulation to be applied on the transferred data. A data transfer commands may include a user read command, a user write command or other data transfer commands.

In operations 720 and 740, the data may be transferred according to the at least one parameter of the data transfer, e.g., by DMA controller 230. Specifically, in operation 720, the DMA controller (e.g., DMA controller 230 or 330) may fetch or retrieve data according to the user read command or the user write command. For example, in case the joint data transfer command includes a user read command, the DMA controller may retrieve the data from a storage (e.g., storage 120), and in case the joint data transfer command includes a user write command, the DMA controller may retrieve the data from the host (e.g., host 210). In operation 730 the data may be manipulated inline with the data transfer (e.g., while the data transfer is being performed or as part of the data transfer), as indicated in the joint data transfer command. In operation 740, the DMA controller may transfer or write the data according to the user read command or the user write command. For example, in case the joint data transfer command includes a user read command, the DMA controller may transfer the data to the host, and in case the joint data transfer command includes a user write command, the DMA controller may store or transfer the data to the storage. For example, for performing a user read command, data may be retrieved form the system storage, manipulated and then provided to a host device, and for performing a user write command, data may be retrieved form a host device, manipulated and then stored in the system storage.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for combining direct memory access (DMA) operations and data services, the method comprising:
obtaining a joint data transfer command, wherein the joint data transfer command comprises at least one parameter of a data transfer and at least one parameter of a manipulation to be applied on the transferred data, wherein the joint data transfer command comprises an error correction command to restore lost data, wherein each of the at least one parameter of the data transfer comprise an error correction (EC) member defining a chunk of data and wherein each of the at least one parameter of the manipulation comprises a Galois coefficient associated with each of the at least one EC member;
transferring the data according to the at least one parameter of the data transfer; and
while transferring the data, manipulating the data according to the at least one parameter of the manipulation, wherein manipulating comprises multiplying each of the EC members by the associated Galois coefficient and adding the multiplication results to restore the lost data.

2. The method of claim 1, wherein the joint data transfer command comprises a scatter gather list (SGL) modified to comprise the parameters of the data manipulation.

3. A method for performing a combined storage operation, the method comprising, using a direct memory access (DMA) controller:
obtaining a modified DMA command, wherein the modified DMA command comprises an error correction command and parameters of the error correction command;
retrieving multiple chunks of data according to the parameters of the error correction command;
performing operations on the retrieved multiple chunks of data according to the parameters of the error correction command to restore lost data, inline with the error correction command; and
transmitting the manipulated data according to the error correction command.

4. The method of claim 3, wherein the modified DMA command comprises a scatter gather list (SGL) modified to comprise the parameters of the error correction command.

5. A direct memory access (DMA) controller comprising:
logic to obtain a modified DMA command from a host processor, wherein the modified DMA command comprises an error correction command and parameters of the error correction command;
logic to retrieve multiple chunks of data according to the parameters of the error correction command;
logic to perform operations on the retrieved multiple chunks of data according to the parameters of the error correction command to restore lost data, inline with the error correction command; and
logic to transmit the manipulated data according to the error correction command.

6. The DMA controller of claim 5, wherein the error correction command complies with Redundant Array of Independent Disks (RAID) 6 configuration.

7. The DMA controller of claim 5, wherein the modified DMA command comprises a scatter gather list (SGL) modified to comprise the parameters of the error correction command.

8. The DMA controller of claim 5, wherein DMA controller is implemented in hardware.

9. The method of claim 1, wherein the error correction command complies with Redundant Array of Independent Disks (RAID) 6 configuration.

10. The method of claim 1, wherein more than one Galois coefficient is associated with each of the at least one EC member, wherein each of the more than one Galois coefficient is used for restoring a different chunk of lost data.

11. The method of claim 3, wherein the error correction command complies with Redundant Array of Independent Disks (RAID) 6 configuration.

12. The method of claim 3, wherein the parameters of the error correction command comprise at least one error correction (EC) member defining a chunk of data and at least one associated Galois coefficient.

13. The method of claim 3, wherein the parameters of the error correction command comprise at least one error correction (EC) member defining a chunk of data and more than one Galois coefficient associated with each of the at least one EC member, wherein each of the more than one Galois coefficient is used for restoring a different chunk of lost data.

14. The DMA controller of claim 5, wherein the parameters of the error correction command comprise at least one error correction (EC) member defining a chunk of data and at least one associated Galois coefficient.

15. The DMA controller of claim 5, wherein the parameters of the error correction command comprise at least one error correction (EC) member defining a chunk of data and more than one Galois coefficient associated with each of the at least one EC member, wherein each of the more than one Galois coefficient is used for restoring a different chunk of lost data.

* * * * *